United States Patent [19]
Lund et al.

[11] Patent Number: 5,367,872
[45] Date of Patent: Nov. 29, 1994

[54] METHOD AND APPARATUS FOR ENHANCING COMBUSTION EFFICIENCY OF SOLID FUEL HYBRID ROCKET MOTORS

[75] Inventors: Gary K. Lund, Ogden; Kent W. Richman, Layton, both of Utah

[73] Assignee: Thiokol Corporation, Ogden, Utah

[21] Appl. No.: 54,752

[22] Filed: Apr. 27, 1993

[51] Int. Cl.⁵ .............................................. F02K 9/28
[52] U.S. Cl. .................................... 60/251; 60/253; 102/288
[58] Field of Search .................... 60/251, 253, 254; 102/288

[56] References Cited

U.S. PATENT DOCUMENTS

| | | | |
|---|---|---|---|
| 2,462,099 | 2/1949 | Hickman | 102/49 |
| 3,014,427 | 12/1961 | Scurlock | 102/288 |
| 3,120,737 | 2/1964 | Holloway | 60/254 |
| 3,221,496 | 12/1965 | Haake | 60/35.6 |
| 3,260,208 | 7/1966 | Schluter | 102/98 |
| 3,316,718 | 5/1967 | Webb | 60/255 |
| 3,358,603 | 12/1967 | Hohenner | 60/254 |
| 3,423,943 | 1/1969 | Stark | 60/251 |
| 3,429,264 | 2/1969 | Oversohl et al. | 102/100 |
| 3,449,600 | 6/1969 | Holzman et al. | 60/251 |
| 3,529,425 | 9/1970 | De Haye | 60/254 |
| 3,557,556 | 1/1971 | Muzzy | 60/251 |
| 3,635,030 | 1/1972 | Schubert et al. | 60/251 |
| 3,715,888 | 2/1973 | Massie | 60/251 |
| 3,722,421 | 3/1973 | Thrailkill et al. | 102/101 |
| 4,543,885 | 10/1985 | Akhagen et al. | 102/288 |
| 4,922,823 | 5/1990 | Rahnenfuhrer et al. | 102/288 |

FOREIGN PATENT DOCUMENTS

803729  1/1969  Canada .................................. 60/253

Primary Examiner—Richard A. Bertsch
Assistant Examiner—Howard R. Richman
Attorney, Agent, or Firm—Madson & Metcalf
Attorney, Agent, or Firm—Ronald L. Lyons; Madson & Metcalf

[57] ABSTRACT

A hybrid rocket motor having enhanced fuel combustion efficiency is disclosed which includes a plurality of axially aligned fuel grains having multiple axial perforations. The fuel grains are rotated or canted relative to adjacent fuel grains such that the multiple axial perforations are offset.

20 Claims, 8 Drawing Sheets

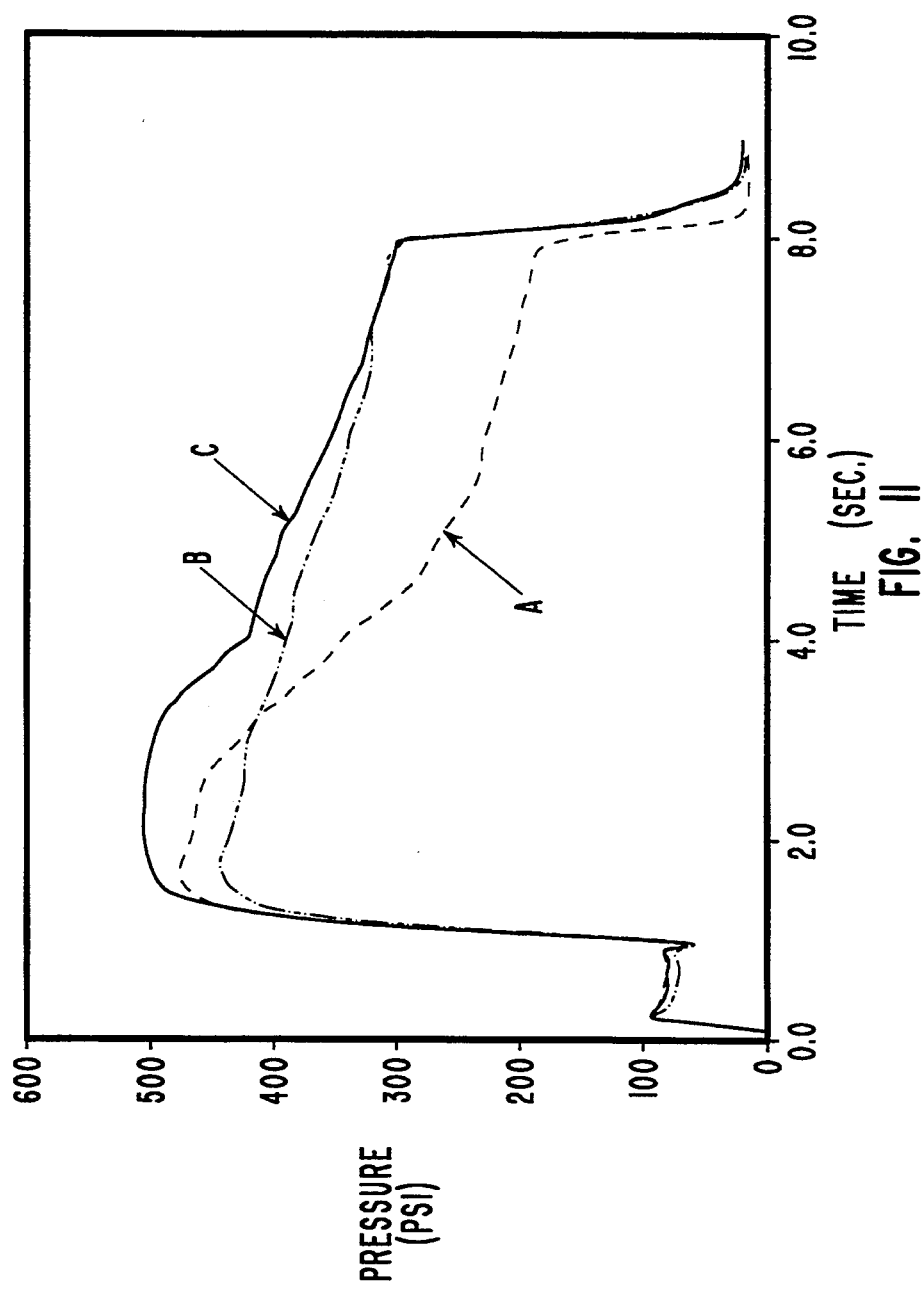

METHOD AND APPARATUS FOR ENHANCING COMBUSTION EFFICIENCY OF SOLID FUEL HYBRID ROCKET MOTORS

BACKGROUND OF THE INVENTION

1. Field of the Invention

This invention relates to hybrid rocket motors. More specifically, the present invention relates to a method for improving combustion efficiency of simple fuels (e.g. hydrocarbon polymers or rubbers) in a hybrid rocket motor utilizing direct oxidizer injection.

2. Technology Background

Hybrid rocket motors utilize solid fuel and fluid oxidizer. The fuel and oxidizer are kept separated until it is desired to operate the motor, at which time the oxidizer is usually injected into the motor to mix with the fuel during operation. It is desirable that the solid fuel extinguish when oxidizer flow is terminated and that the regression rate of the fuel be directly proportional to the oxidizer flow rate, i.e. that the system can be throttled.

By contrast, solid propellants integrally mix the fuel and oxidizer together. Solid propellants are useful because of their ease of storage in which the propellants can be cast or molded into a desired form and stored until time for use. The disadvantage is that once ignited, the propellant burns until exhausted since there is no reliable means to extinguish the rocket and then reignite it. Liquid propellants using liquid fuel and liquid oxidizer permit control of the rocket motor combustion by simply controlling the fuel and oxidizer flow rates. A disadvantage of liquid propellants is the difficulty of liquid storage and complex fluid control mechanisms.

Hybrid rocket motor development has been evolving for a number of years. One of the most difficult technologies encountered during development of hybrid rocket motors has been the achievement of sufficiently high solid fuel regression during motor operation to allow simple grain geometries and high propellant mass fractions to be employed in motor design. In achieving this end, a multitude of fuel additives and formulations, including reactive metals, oxidizers, and catalysts have been investigated in hybrid motor development programs using liquid or gaseous oxidizer injection.

Unfortunately, the above approaches suffer from significant safety and handling considerations. In general, use of solid oxidizer at levels sufficient to achieve the desired regression rate enhancements in the fuel grains results in compositions capable of sustaining low level combustion in the absence of supplemental oxidizer making these behave as conventional solid propellants. Use of reactive metals can raise problems in fuel grain processing and storage due to moisture and air sensitivity. Other additives, such as fluorine or perchlorate in the propellant system, result in acidic and toxic hydrogen halides in the exhaust, which can result in environmental damage, particularly with large booster motor applications. Thus, known methods of improving hybrid motor ballistic properties suffer from undesirable side effects, such as component toxicity and hazards, and environmental effects from exhaust products.

It will be appreciated that there is a need in the art for methods and apparatus for improving combustion efficiency and regression rate of fuels in a hybrid rocket motor without undesirable toxicity, safety, and environmental effects. It would also be an advancement in the art to provide methods and apparatus for enhanced hybrid combustor operation which utilize inexpensive, simple fuels.

Such methods and apparatus for improving combustion efficiency and regression rate of simple fuels in hybrid rocket motors are disclosed and claimed herein.

SUMMARY OF THE INVENTION

The present invention is directed to hybrid rocket motors having enhanced fuel combustion efficiency and regression rates. The rocket motors within the scope of the present invention include a plurality (at least two, and preferably three or more) of axially aligned solid fuel grains having multiple axial perforations. The fuel grains are rotated or offset relative to adjacent fuel grains such that the multiple axial perforations of one fuel grain are canted or misaligned relative to an adjacent grain. The intentional canting of adjacent fuel grains maximizes oxidizer and gaseous combustion product turbulence within the rocket motor. The canting also increases solid fuel surface area for a given volumetric loading. Improved heat transfer and oxidizer transport to the solid fuel surface dramatically increases fuel utilization and regression rate for a given oxidizer flow rate and pressure. By utilizing a plurality of perforated grains to achieve the desired rocket motor grain configuration, production is simplified inasmuch as each grain segment is easily cast or formed by conventional means and subsequently oriented in the motor case to provide the complex surface desired.

From the foregoing, it will be appreciated that the present invention provides for greatly improved fuel utilization characteristics in classical inert solid fuel hybrid rocket motors. The invention also minimizes motor length, total fuel surface area required and spatial regression rate dependance for achieving enhanced hybrid combustor operation with inexpensive, simple fuels.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 11 is a graphical illustration of the effect propellant grain orientation has on rocket motor pressure over time. Boost and sustain pressure profiles are obtained by using a combination of center perforated (CP) fuel grains and multiport canted fuel grains located downstream (aft) of the CP grains.

DETAILED DESCRIPTION OF THE INVENTION

The present invention provides a method of arranging solid fuel grains in a hybrid rocket motor which results in enhanced combustion efficiency. In the simplest form of the invention, the fuel is formed into multiple solid grains, each containing more than one perforation or port. The fuel grains are cartridge loaded into a combustion chamber of appropriate dimensions to contain at least two, and preferably three or more of the individual grains sequentially. According to the present invention, the perforations of each grain are purposely misaligned or "canted" with those of the grain segment preceding it so as to maximize hindrance to oxidizer and combustion product flow within the motor. For example, as illustrated in FIGS. 2-7, in a motor comprised of fuel grains containing three perforations, each grain is rotated 60° with respect to the grain preceding it; for fuel grains containing two perforations, each grain is rotated 90° with respect to the grain preceding it; for fuel grains containing four perforations, each grain is rotated 45° and so on.

The effect of this misalignment or "canting" increases fuel surface area for a given volumetric loading and dramatically improves fuel regression rate within each grain. Flow turbulence with the combustor is maximized, thereby enhancing both heat transfer and oxidizer transport to the solid fuel surface, which results in dramatically improved fuel utilization and regression rate at a given oxidizer flow rate and operating pressure when compared with conventional in-line single or multiple port configurations.

Figure 1:
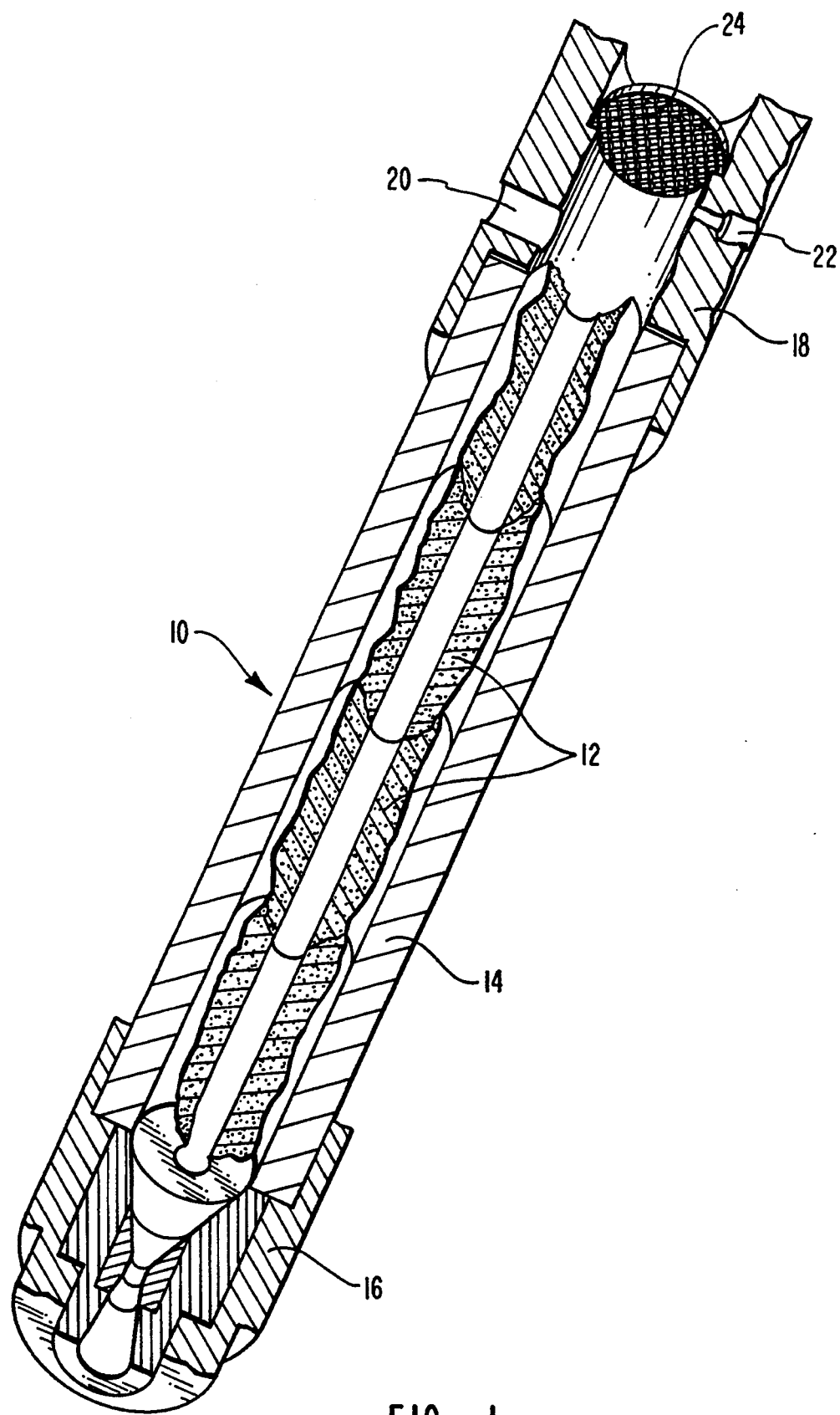
FIG. 1 is a cross-sectional perspective view of combustor hardware used in multiple grain test configurations.
Figure 2:
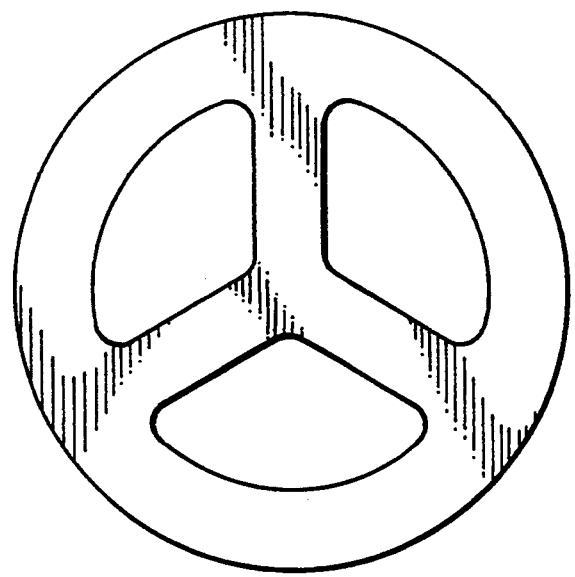
FIG. 2 is an end view of a fuel grain containing three perforations or ports.
Figure 3:
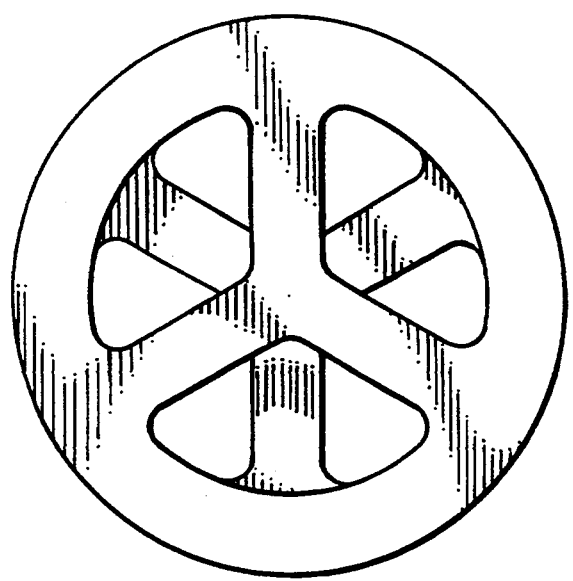
FIG. 3 is an end view of two fuel grains according to FIG. 2 which are axially positioned and which the perforations are offset with respect to each other.
Figure 4:
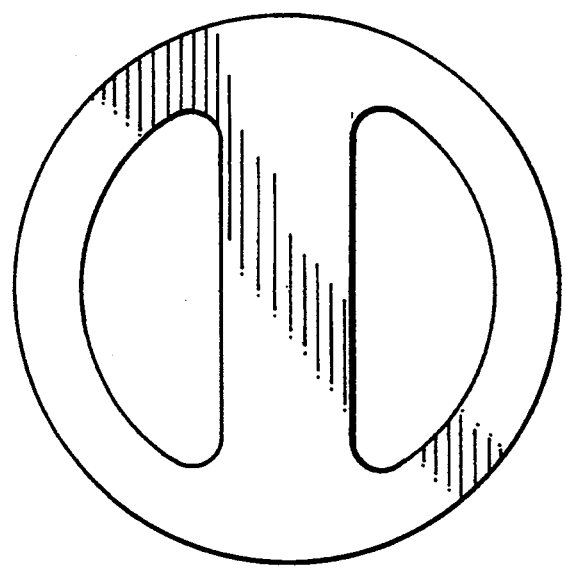
FIG. 4 is an end view of a fuel grain containing two perforations or ports.
Figure 5:
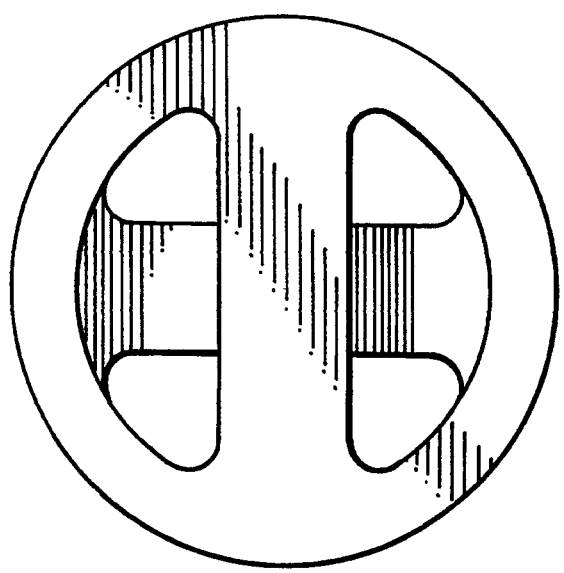
FIG. 5 is an end view of two fuel grains according to FIG. 4 which are axially positioned and which the perforations are offset with respect to each other.
Figure 6:
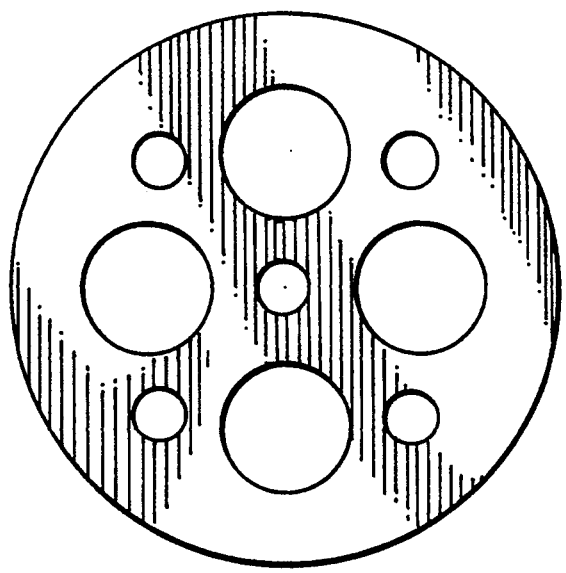
FIG. 6 is an end view of a fuel grain containing nine perforations or ports.
Figure 7:
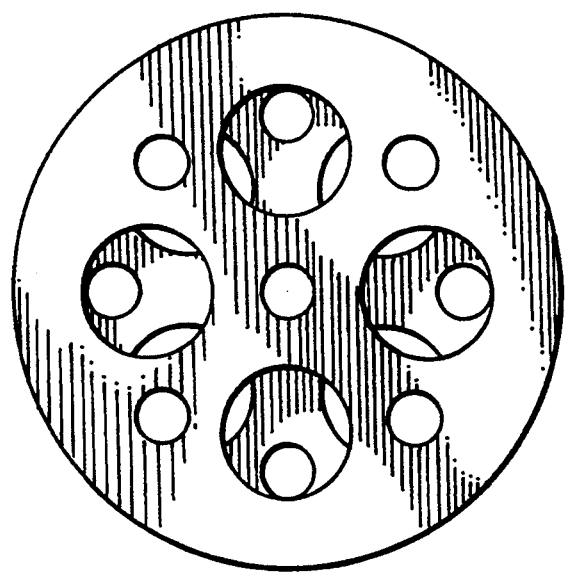
FIG. 7 is an end view of two fuel grains according to FIG. 6 which are axially positioned and which the perforations are offset with respect to each other.

A series of tests were performed on a two-inch diameter hybrid rocket motor, such as that illustrated in FIG. 1. Hybrid rocket motor 10 of FIG. 1 includes a plurality of solid fuel grains 12 encased in a cylindrical casing 14. An aft closure 16 and a forward closure 18 are located at opposite ends of cylindrical casing 14. Forward closure 18 includes an ignition port 20 for igniting the solid fuel grains and a pressure port 22 for monitoring combustion pressure. A diffuser screen 24 is positioned within forward closure 18, through which oxygen is flowed into the motor.

Three-port hydroxy terminated polybutadiene (HTPB) grains were employed to evaluate several parameters such as combustion behavior of noncircular ports (pie shaped), regression rate analysis of noncircular multiport configurations, and a assessment of canted versus in-line port alignment on regression rates. The fuel grains had a cross-sectional configuration similar to the fuel grain of FIG. 2.

Figure 8:
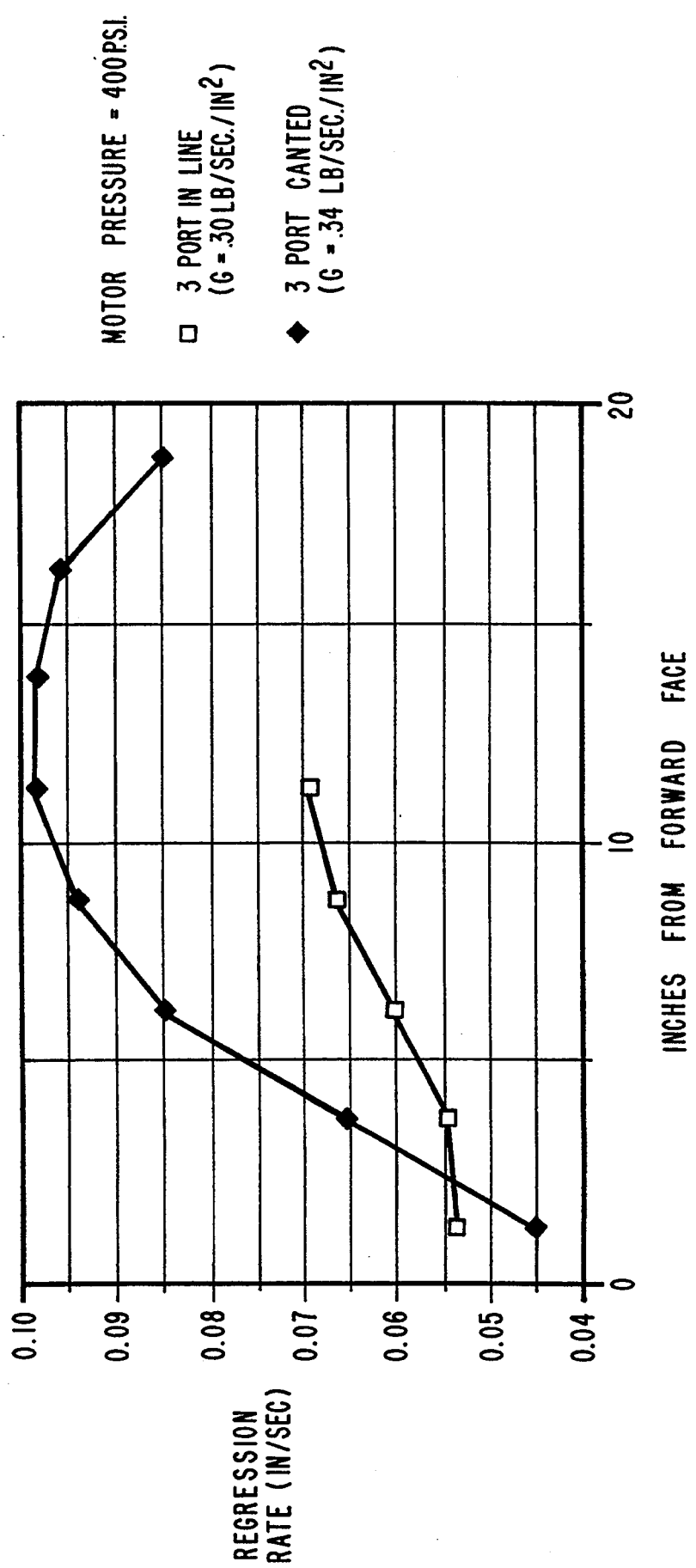
FIG. 8 is a graphical comparison of regression rates obtained at various axial locations in multiple grain hybrid tests with either three-port in-line or three-port canted (staggered) geometries. The oxygen mass flux (G) and motor pressure are similar for both tests.
Figure 9:
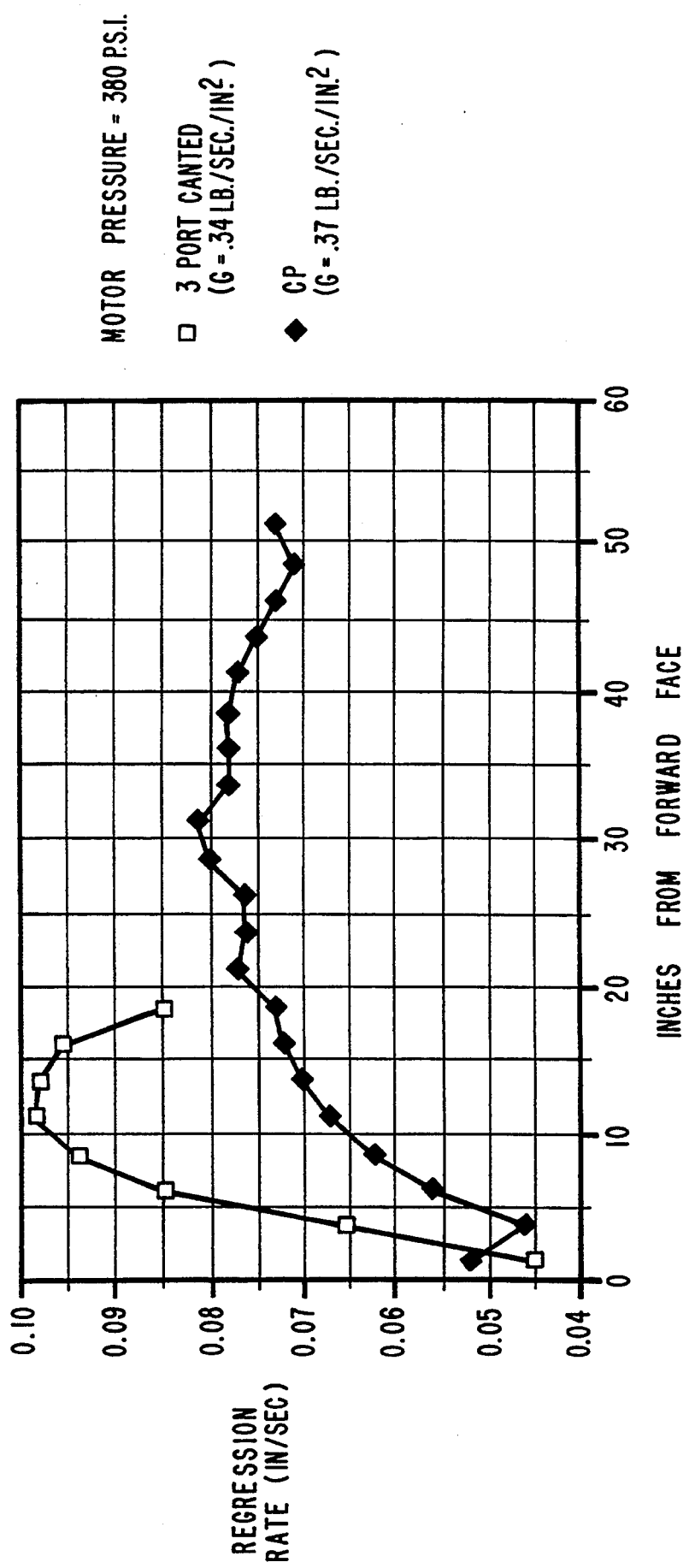
FIG. 9 is a graphical comparison of regression rates achieved in three-port canted or simple center perforated (CP) grain geometries at similar oxygen mass flux (G) and motor chamber pressures.
Figure 10:
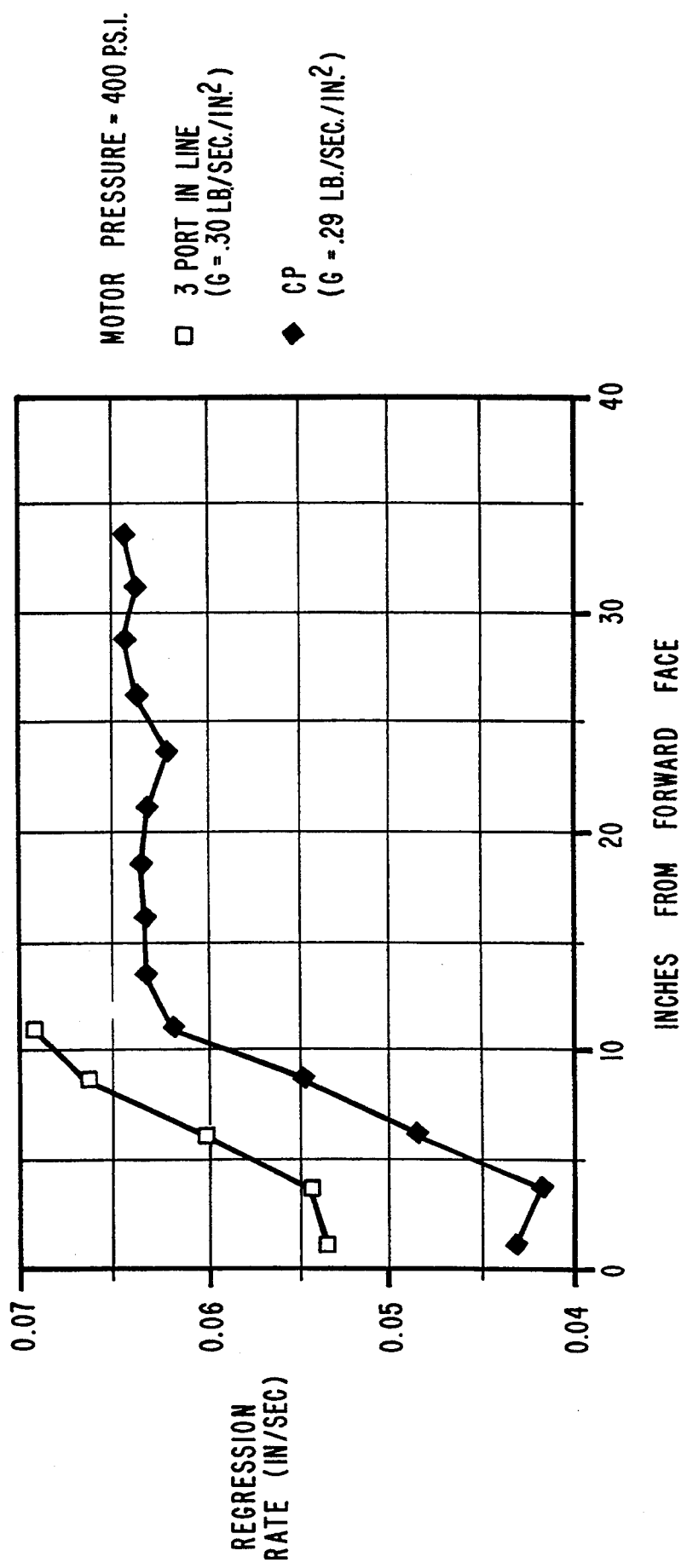
FIG. 10 is a graphical comparison of regression rates for simple center perforated (CP) and in-line three-port grain geometries in multiple grain hybrid combustor tests. Both oxygen mass flux (G) and motor chamber pressure are similar. Regression rate differences are small for both tests relative to that obtained with the canted configuration indicating little enhancement due to in-line multiple ports.

The test results, summarized in FIGS. 8-10 indicate that uniform regression was achieved which is described by equivalent radius (i.e. hydraulic) calculations for the in-line configuration. The term regression or regression rate is intended to embrace the rate at which the solid fuel grain burns or regresses. It is determined by measuring the decrease in web thickness of solid fuel grains over time. The observed (measured and calculated) regression rates reported in FIGS. 8-10 are consistent with baseline data. Web and port area measurements indicate effective regression rates of at least 1.3 times those obtained with in-line geometries are obtained with the canted configuration at equivalent pressure and oxygen mass flux values. This increase is similar to that obtained with partially metallized configurations and represents a substantial performance improvement for simple polymer fuel hybrids. Not only are regression rates substantially higher in the canted configuration, but except for the first two grains, length dependent regression rate changes are minimized until oxidizer starvation occurs. It is anticipated that regression rates greater than 0.1 inches/second (ips) may be achieved at moderate oxygen flux and chamber pressure levels when utilizing a simple polybutadiene based fuel without resorting to high levels of energetic additives such as glycidyl azide polymer (GAP).

Further testing of multiport fuel grains validated the regression rate results for multiport configurations. The canted grain configurations gave regression rates near 0.1 ips for HTPB fuel, an increase of at least 1.3 times that of the corresponding in-line configurations in both three-port and two-port grain designs. In addition, the three-port and two-port grains showed similar regression rates in both the canted and in-line motor configurations. This leads to the conclusion that the large increase in regression rates obtained by canting the three-port grains is not simply the result of a fortuitous choice of port geometry, but is the result of canting the multiport fuel grain.

A series of three tests were conducted to evaluate the effect of fuel grain orientation on the pressure performance. In test A, four HTPB fuel grain cartridges, 2.5 inches long by 2 inches diameter with a one inch diameter center perforation (CP) were loaded into an in line combustor along with three ¾ inch long by 2 inches diameter three port grains offset 60° from each other. The three port grains were placed down stream of the CP grains (aft end). The combustor was operated with gaseous oxygen at an average mass flux of 0.3 lb/sec/$in^2$ for approximately seven seconds. The pressure trace of curve A resulted, illustrated in FIG. 11. The contribution to the total motor pressure resulting from the canted grains is evident in the first half of the test which produced significantly higher thrust levels followed by a less regressive, low thrust period due to combustion of the CP grains alone as the canted grains had been consumed. In this test, the effects are exaggerated due to nozzle erosion.

Test B was conducted in the same manner as Test A, except that the canted grains were placed forward of the CP grains. In this position, the canted grains are consumed more slowly and were still contributing a the end of the test. Thus, a steady regressive thrust is observed. No nozzle erosion occurred in this test. The results of Test B are illustrated as curve B in FIG. 11.

Test C was conducted in the same manner as Tests A and B except that canted grains (3 each) were placed both forward and aft of three CP grains. In this case, the contribution from the aft CP grains is again clearly evident during the first two seconds of the test at which point they were consumed. The pressure trace then becomes similar to that observed for Test B as the CP grains and forward canted grains continued to be combusted. No nozzle erosion occurred in this test. The results of Test C are illustrated as curve C in FIG. 11.

From the results of Tests A, B and C, illustrated graphically in FIG. 11, the present invention provides a means by which to tailor the ballistic thrust profile of a solid fuel hybrid rocket by utilizing combinations of grain orientations. As illustrated in both Tests A and C, a boost-sustain type profile may be obtained which is useful in many tactical type rocket motors which require high initial acceleration followed by reduced thrust cruising. Importantly, it is possible to use a shorter rocket motor having canted multiple-perforated fuel grains in place of longer "center perforated" rocket motors resulting in significant inert weight savings.

From the forgoing, it will be appreciated that the present invention provides for greatly improved fuel utilization characteristics in classical inert solid fuel hybrid rocket motors. The invention also minimizes motor length, total as cast fuel surface area required and spatial regression rate dependance for achieving enhanced hybrid combustor operation with inexpensive, simple fuels.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hybrid rocket motor comprising:
   a combustion chamber having aft and forward sections; and
   a plurality of solid fuel grains, each grain containing more than one perforation and said fuel grains being cartridge loaded into the combustion chamber along a rocket motor axis such that the perforations of at least two solid fuel grains are misaligned with the perforations of an adjacent solid fuel grain and such that the fuel grains are arranged within the combustion chamber to allow gas flow through the perforations in a direction substantially parallel to the rocket motor axis.

2. A hybrid rocket motor as defined in claim 1, wherein the plurality of multiple-perforated solid fuel grains are located throughout the length of the combustion chamber.

3. A hybrid rocket motor as defined in claim 1, wherein the plurality of multiple-perforated solid fuel grains are located in the forward section of the combustion chamber.

4. A hybrid rocket motor as defined in claim 1, further comprising at least one center perforated solid fuel grain.

5. A hybrid rocket motor as defined in claim 4, wherein the plurality of multiple-perforated solid fuel grains are located downstream (aft) of the at least one center perforated solid fuel grain to provide a boost and sustain rocket motor performance profile.

6. A hybrid rocket motor as defined in claim 1, wherein each of the plurality of fuel grains contains two perforations.

7. A hybrid rocket motor as defined in claim 6, wherein the plurality of fuel grains are axially rotated around the rocket motor axis about 90° with respect to adjacent fuel grains.

8. A hybrid rocket motor as defined in claim 1, wherein each of the plurality of fuel grains contains three perforations.

9. A hybrid rocket motor as defined in claim 8, wherein the plurality of fuel grains are axially rotated around the rocket motor axis about 60° with respect to adjacent fuel grains.

10. A hybrid rocket motor as defined in claim 1, wherein each of the plurality of fuel grains contains at least four perforations.

11. A hybrid rocket motor as defined in claim 10, wherein the plurality of fuel grains are axially rotated around the rocket motor axis about 45° with respect to adjacent fuel grains.

12. A hybrid rocket motor having enhanced fuel combustion efficiency comprising a plurality of fuel grains, said fuel grains being aligned along a rocket motor axis and having multiple axial perforations, at least two of said fuel grains being rotated around the rocket motor axis relative to adjacent fuel grains so as to offset the multiple axial perforations with respect to adjacent multiple axial perforations, and wherein the plurality of fuel grains are arranged within the hybrid rocket motor to allow gas flow through the multiple axial perforations in a direction substantially parallel to the rocket motor axis.

13. A hybrid rocket motor as defined in claim 12, wherein the hybrid rocket motor further comprises a combustion chamber and the plurality of fuel grains having multiple axial perforations are located throughout the length of the combustion chamber.

14. A hybrid rocket motor as defined in claim 12, wherein the hybrid rocket motor further comprises a combustion chamber having aft and forward sections and the plurality of fuel grains having multiple axial perforations are located in the forward section of the combustion chamber.

15. A hybrid rocket motor as defined in claim 12, further comprising at least one center perforated solid fuel grain aligned along the rocket motor axis.

16. A hybrid rocket motor as defined in claim 15, wherein the plurality of fuel grains having multiple axial perforations are located downstream (aft) of the at least one center perforated solid fuel grain to provide a boost and sustain rocket motor performance profile.

17. A hybrid rocket motor having enhanced fuel combustion efficiency comprising a plurality of fuel grains, said fuel grains being aligned in a longitudinal direction along a rocket motor axis and having multiple perforations in said longitudinal direction, at least two of said fuel grains being horizontally offset, along a horizontal plane normal to the rocket motor axis, relative to adjacent fuel grains such that the multiple longitudinal perforations are horizontally offset, and wherein the plurality of fuel grains are structurally located within the hybrid rocket motor to allow gas flow through the multiple longitudinal perforations in a direction substantially parallel to the rocket motor axis.

18. A hybrid rocket motor as defined in claim 17, wherein the hybrid rocket motor further comprises a combustion chamber and the plurality of fuel grains having multiple longitudinal perforations are located throughout the length of the combustion chamber.

19. A hybrid rocket motor as defined in claim 17, wherein the hybrid rocket motor further comprises a combustion chamber having aft and forward sections and the plurality of fuel grains having multiple longitudinal perforations are located in the forward section of the combustion chamber.

20. A hybrid rocket motor as defined in claim 17, further comprising at least one center perforated solid fuel grain aligned along the rocket motor axis.

* * * * *